(12) United States Patent
Aardahl et al.

(10) Patent No.: US 7,081,231 B1
(45) Date of Patent: Jul. 25, 2006

(54) METHOD AND SYSTEM FOR THE COMBINATION OF NON-THERMAL PLASMA AND METAL/METAL OXIDE DOPED γ-ALUMINA CATALYSTS FOR DIESEL ENGINE EXHAUST AFTERTREATMENT SYSTEM

(75) Inventors: Christopher L. Aardahl, Richland, WA (US); Mari Lou Balmer-Miller, West Richland, WA (US); Ashok Chanda, Peoria, IL (US); Craig F. Habeger, West Richland, WA (US); Kent A. Koshkarian, Peoria, IL (US); Paul W. Park, Peoria, IL (US)

(73) Assignees: Caterpillar Inc., Peoria, IL (US); Battelle Memorial Institute, Richland, WA (US)

( * ) Notice: Subject to any disclaimer, the term of this patent is extended or adjusted under 35 U.S.C. 154(b) by 1261 days.

(21) Appl. No.: 09/708,863

(22) Filed: Nov. 8, 2000

(51) Int. Cl.
*B01D 50/00* (2006.01)
*F01N 3/10* (2006.01)

(52) U.S. Cl. .................. 422/169; 422/171; 422/172; 422/174; 423/212; 423/213.2; 423/213.7; 60/272; 60/273; 60/274; 60/275; 60/282; 60/299

(58) Field of Classification Search ............... 422/169, 422/171, 172, 174; 423/212, 213.2, 213.7; 60/272, 273, 274, 275, 282, 299
See application file for complete search history.

(56) References Cited

U.S. PATENT DOCUMENTS

| 5,609,736 | A | 3/1997 | Yamamoto |
| 5,711,147 | A | 1/1998 | Vogtlin et al. |
| 5,746,984 | A | 5/1998 | Hoard |
| 5,891,409 | A | 4/1999 | Hsiao et al. |
| 5,893,267 | A | 4/1999 | Vogtlin et al. |
| 6,038,853 | A | 3/2000 | Penetrante et al. |

(Continued)

FOREIGN PATENT DOCUMENTS

DE   198 20 682 A   11/1998

(Continued)

OTHER PUBLICATIONS

"Promotive Effect of Sn on the Catalytic Activity of Al2O3 for the Selective Reduction of NO by Methanol", Tabata et al., Catalysis Lettters 25 (1994), pp. 55-60, J. C. Baltzer AG, Science Publishers.

(Continued)

*Primary Examiner*—Glenn Caldarola
*Assistant Examiner*—Alexis Wachtel
(74) *Attorney, Agent, or Firm*—Liell & McNeil

(57) ABSTRACT

The present disclosure pertains to a system and method for treatment of oxygen rich exhaust and more specifically to a method and system that combines non-thermal plasma with a metal doped γ-alumina catalyst. Current catalyst systems for the treatment of oxygen rich exhaust are capable of achieving only approximately 7 to 12% $NO_x$ reduction as a passive system and only 25–40% reduction when a supplemental hydrocarbon reductant is injected into the exhaust stream. It has been found that treatment of an oxygen rich exhaust initially with a non-thermal plasma and followed by subsequent treatment with a metal doped γ-alumina prepared by the sol gel method is capable of increasing the $NO_x$ reduction to a level of approximately 90% in the absence of $SO_2$ and 80% in the presence of 20 ppm of $SO_2$. Especially useful metals have been found to be indium, gallium, and tin.

20 Claims, 8 Drawing Sheets

U.S. PATENT DOCUMENTS

| | | | |
|---|---|---|---|
| 6,038,854 | A | 3/2000 | Penetrante et al. |
| 6,232,253 | B1 * | 5/2001 | Narula et al. ............... 502/4 |
| 6,592,833 | B1 * | 7/2003 | Kharas ................. 423/239.1 |

FOREIGN PATENT DOCUMENTS

| | | |
|---|---|---|
| WO | WO 01 76733 | 10/2001 |

OTHER PUBLICATIONS

"Ga2O3/Al2Oe Prepared by Sol-Gel Method as a Highly Active Metal Oxide-Based Catalyst for NO Reduction by Propene in the Presence of Oxygen, H2O and sO2", Haneda et al., Chemistry Letters 1998, pp. 181-182, Chemistry Letters 1998, The Chemical Society of Japan, 1998.

"Lean NOx Catalysis over Sn/y-Al2O3 Catalysts", Kung et al., Journal of Catalysis 181, 1999, pp. 1-5, Academic Press, 1999.

"Influence of local structure on the catalytic activity of gallium oxide for the selective reduction of NO by CH4", Shimizu et al., pp. 1827-1828, Chem. Commun., 1996.

"Activity enhancement of SnO2-doped Ga2O3-Al2O3 catalysts by coexisting H2O for the selective reduction of NO with propene", Haneda et al., Applied Catalysis B: Environmental 20 1999. pp. 289-300, Elsevier Science B. V. 1999.

"Selective Reduction of Nitrogen Monoxide with Hydrocarbons over SnO2 Catalyst", Teraoka et al., Chemistry Letters 1993, pp. 773-776, The Chemical Society of Japan, 1993.

"Alumina-supported Catalysts for the Selective Reduction of Nitric Oxide by Propene", Miyadera et al., Chemistry Letters 1993, pp. 1483-1486, The Chemical Society of Japan 1993.

"Characterization of SnO2/Al2O3 Lean NOx Catalysts", Park et al., Journal of Catalysis 184, 1999, pp. 440-454, Academic Press 1999.

"Enhanced activity of In and Ga-supported sol-gel alumina catalysts for NO reduction by hydrocarbons in lean conditions", Applied Catalysis B: Environmental 15 1998, pp. 291-304, Elsevier Science B. V. 1998.

"Plasma-Enhanced Catalytic Reduction of NOx in Simulated Lean Exhaust", Aardahl et al., Society of Automotive Engineers, Inc. 2000.

* cited by examiner

METHOD AND SYSTEM FOR THE COMBINATION OF NON-THERMAL PLASMA AND METAL/METAL OXIDE DOPED γ-ALUMINA CATALYSTS FOR DIESEL ENGINE EXHAUST AFTERTREATMENT SYSTEM

This invention was made with Government support under DOE Contract No. DE-AC06-76RLO 1830 awarded by the U.S. Department of Energy. The Government has certain rights to this invention.

TECHNICAL FIELD

This invention relates generally to a system and method for treatment of lean exhaust, such as diesel exhaust and lean burn gasoline engine exhaust, to reduce nitrogen oxide ($NO_x$) emissions and more specifically to a method and system that combines non-thermal plasma with a metal doped γ-alumina catalyst for $NO_x$ reduction.

BACKGROUND ART

The catalytic converters, especially three-way catalysts, used in combination with modern gasoline engines have resulted in a great reduction in tailpipe emissions of carbon monoxide, hydrocarbons and $NO_x$. There is an increasing emphasis on fuel efficiency and diesel engines have an efficiency advantage over gasoline engines. Unfortunately, diesel engines are "lean burn" engines and their exhaust has very high levels of oxygen. These high levels of oxygen render gasoline catalytic converters useless for $NO_x$ reduction. Catalysts or catalytic systems that have been utilized for lean burn engines to date suffer from low removal of $NO_x$, low thermal stability and a limited temperature window of operation. Most current catalytic systems for lean burn engines only achieve 7–12% $NO_x$ reduction as a passive system and 25–40% when supplemental hydrocarbon reductant is injected into the exhaust stream. Use of a non-thermal plasma system for reduction of $NO_x$ in conjunction with a particulate trap is disclosed in U.S. Pat. No. 6,038,854 issued Mar. 21, 2000 to Penetrante et al.

The present invention is directed to overcome one or more of the problems as set forth above.

DISCLOSURE OF THE INVENTION

In one aspect of this invention, there is disclosed a method for nitrogen oxide ($NO_x$) reduction in an oxygen rich engine exhaust comprising the steps of passing an oxygen rich exhaust through a non-thermal plasma thereby converting nitrogen oxide (NO) and hydrocarbons in the oxygen rich exhaust into nitrogen dioxide ($NO_2$) and oxidized hydrocarbons and forming an intermediate exhaust; and then passing the intermediate exhaust over at least one metal doped γ-alumina, wherein the γ-alumina has been prepared with a pore volume of greater than 1.0 cubic centimeters per gram, thereby converting the $NO_2$ to nitrogen ($N_2$).

In another aspect of the invention, it is an exhaust treatment system for nitrogen oxide reduction in lean burn engines comprising a non-thermal plasma in the exhaust system that is adapted to receive an oxygen rich exhaust, the non-thermal plasma converting the nitrogen oxide (NO) and hydrocarbons in the oxygen rich exhaust into nitrogen dioxide ($NO_2$) and oxidized hydrocarbons, and a catalytic unit operably connected to the exhaust system and adapted to receive the oxygen rich exhaust after the non-thermal plasma, the catalytic unit comprising at least one metal doped γ-alumina, wherein the γ-alumina has a pore volume of at least 1.0 cubic centimeters per gram and the metal comprises indium, tin, gallium, silver, gold, copper, cobalt, iron, cerium, or mixtures thereof.

BEST MODE FOR CARRYING OUT THE INVENTION

Figure 1:
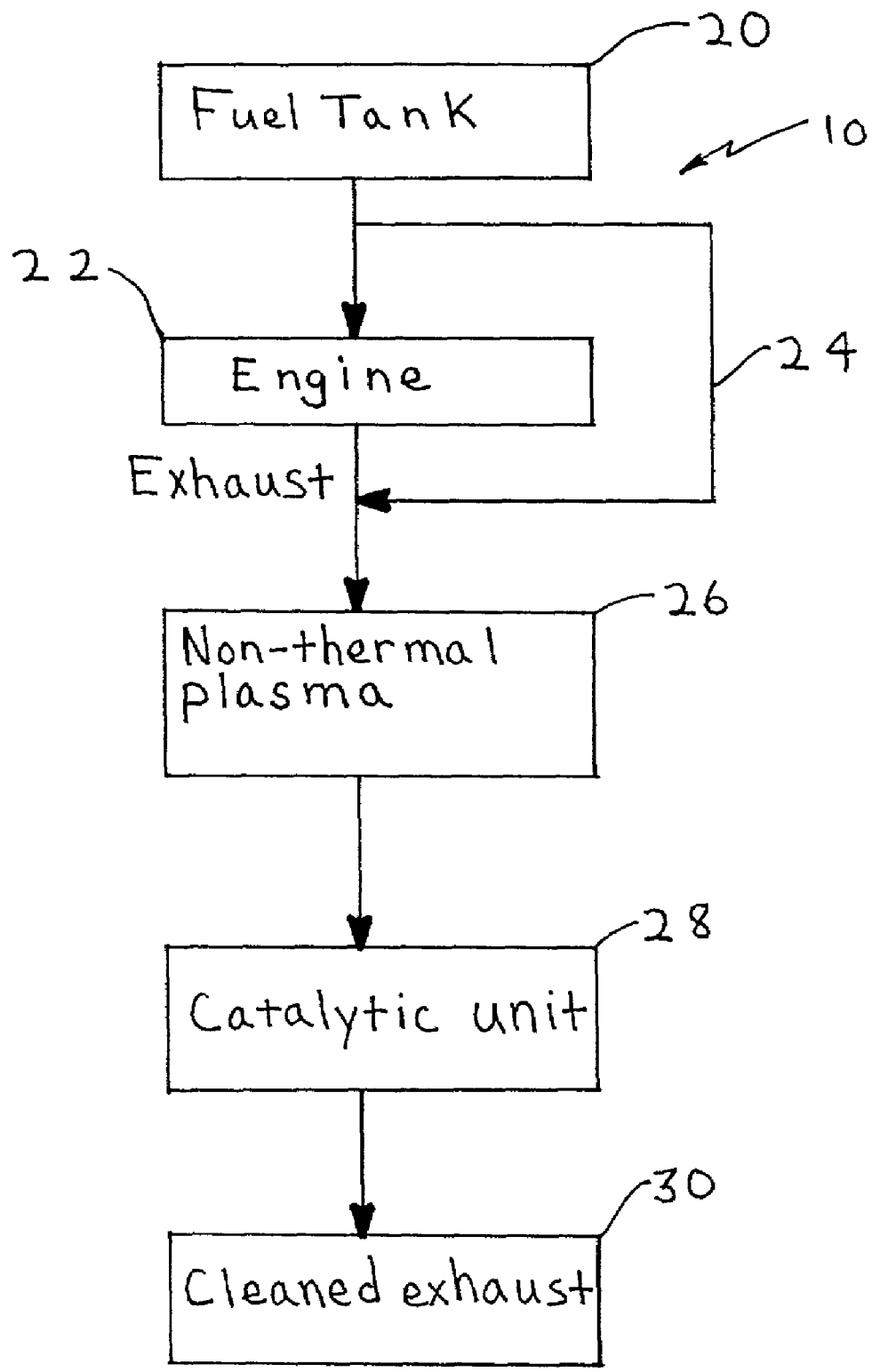
FIG. 1 is a block diagram of a machine embodiment of the present invention.

In FIG. 1 a block diagram of a machine embodiment of the present invention is shown generally at 10. A fuel tank 20 delivers fuel to a "lean burn" engine 22. Throughout the specification and the claims a lean burn engine is defined as one that produces an oxygen rich exhaust, which is defined as an exhaust having a higher molar ratio of oxygen than the total molar ratio of reductive compounds such as CO, hydrogen and hydrocarbons. The exhausts have an oxidative environment. Examples of such engines include diesel engines and various lean burn gasoline engines. Generally, these systems generate an exhaust having an oxygen content of from 4 to 16% depending on the load conditions and the running mode of the engine. An oxygen rich exhaust exits engine 22 and is directed to pass through a non-thermal plasma 26. Preferably, this exhaust is supplemented, prior to treatment in the non-thermal plasma, by the addition of an atomized hydrocarbon or mixture of hydrocarbons 24. One source of these hydrocarbons can be the diesel fuel from the fuel tank 20. Alternatively, as is known in the art, the supplemental hydrocarbon source can be other hydrocarbons other than the fuel.

Generation of a non-thermal plasma 26 is well known in the art and will not be described in detail. In brief, a non-thermal plasma is created by connecting an alternating current voltage source to a pair of spaced apart electrodes having a dielectric barrier located in the space between them. In a typical system one of the electrodes is formed by a rod located in the center of an exhaust tube and the exhaust tube forms the other electrode. Preferably the alternating current voltage source generates a current of approximately 10 to 30 kilovolts. Because of the speed of the cycling of the alternating current voltage an electron and ionized gas cloud is created in the space between the two electrodes. The non-thermal plasma in the presence of oxygen and hydrocarbons will convert $NO_x$ into $NO_2$ plus oxygenated hydrocarbons such as alcohols, aldehydes, and ketones. This generates an intermediate exhaust, which contains $NO_2$, oxygenated hydrocarbons, unreacted hydrocarbons, and oxygen. In the non-thermal plasma 26 up to 95% of the $NO_x$ is converted to $NO_2$.

The intermediate exhaust is directed to a catalytic unit 28. Deposited within the catalytic unit is a metal doped γ-alumina catalyst. The composition of this metal doped γ-alumina catalyst is described more fully below. In the catalytic unit 28 a substantial portion of the $NO_2$ is converted to the reaction products of $N_2$, carbon dioxide, and water. The conversion products leave the catalytic unit as a cleaned exhaust 30.

Formation of γ-Alumina by a Sol Gel Procedure

It has been found in the present invention that γ-alumina formed by a sol gel method produces an alumina having unique properties for utilization in plasma-assisted catalysis (PAC) of oxygen rich exhaust. The γ-alumina was prepared by a complexing agent-assisted sol gel method.

In the sol gel method aluminum isopropoxide (AIP) (98+%, Aldrich Chemical Company, Inc.) was dissolved in 2-methyl-2,4-pentanediol (MPD) (99% Aldrich Chemical Company, Inc.). First, 500 g AIP was placed in a 2-liter glass beaker and then 600 milliliters of MPD was added immediately and the mixture was stirred vigorously with a mechanical polyethylene stirrer. Once the mixture was homogeneous, the beaker was placed in a constant temperature bath at a range of from 110 to 130° C. and stirred continuously. After approximately 1 hour of stirring, all of the AIP was dissolved in the MPD. As the AIP reacts with the MPD, it produces 2-propanol which is released as a vapor at these temperatures. Gelation was completed after approximately 4 hours of reaction. Then 400 milliliters of water were added to stop the gelation and a white precipitate of aluminum hydroxide was obtained. The aluminum hydroxide solid was redispersed in water and aged at a temperature of from 60 to 90° C. overnight with constant stirring.

After aging overnight, 600 milliliters of 2-propanol was added to remove the water from the pores of the precipitate. Although 2-propanol is preferred, any organic solvent having a surface tension of approximately equal to or less than 30 mN/m will be useful. It is just necessary that the solvent have a surface tension significantly below that of water, which is approximately 72 mN/m. The resulting slurry was vacuum filtered and dried at approximately 90° C. in an oven for 48 hours.

Calcination was carried out in a temperature programmed tube furnace with 5 L/min air flowing through it. A general calcination schedule is as follows: ramp the temperature from 100° C. to 460° C. at 1° C./min with air flowing through it; ramp the temperature from 460° C. to 700° C. at 1° C./min with 2% $H_2O$/air; 2 hours at 700° C. with 6% $H_2O$/air; and turn off the heat and continue flowing air over the alumina until the temperature is reduced to 100° C.

This sol gel procedure resulted in γ-alumina ($Al_2O_3$) with a high surface area of approximately 200 to 230 m²/g, a pore volume of from 1 to 2 cc/g, and a pore size of from 4 to 20 nm. Throughout the specification and claims the sol gel γ-alumina prepared according to the present invention was prepared as described above, the few exceptions are noted below.

Formation of Metal Doped γ-Alumina

A metal doped γ-alumina prepared according to the present invention can be prepared in one of two ways. In one method, the subject metal is solubilized in the water that is used to stop gelation during the sol gel procedure described above. In a second method, the sol gel γ-alumina is doped with a metal by an incipient wetness method. In this method, the sol gel γ-alumina is brought into contact with a solution of the appropriate metal. The solution of the metal is present in an amount equal to or greater than the total pore volume of the γ-alumina sample. The pore volume of γ-alumina prepared according to the present invention is generally from 1.0 to 2.0 cubic centimeters per gram.

To form a tin doped γ-alumina by the incipient wetness method an appropriate amount of $SnCl_2$ was dissolved in an ethanol solution and brought into contact with the sol gel γ-alumina. The tin doped γ-alumina catalyst was calcined at 600° C. for 5 hours and then at 800° C. for 2 hours.

An indium doped γ-alumina was prepared in the same manner using $In(NO_3)_3$ in a water solution instead of ethanol. The indium doped γ-alumina catalyst was calcined at 600° C. for 5 hours.

A gallium doped γ-alumina was prepared by exposing the γ-alumina to a water solution of $Ga(NO_3)_3 \cdot xH_2O$ which was added to the aluminum oxide gel during the γ-alumina preparation in the sol gel method. The gallium doped γ-alumina catalyst was calcined at 600° C. for 5 hours.

Catalytic Performance Tests

Reactor bench tests to characterize the catalytic performance of various samples were performed in a quartz micro tube reactor with a feed gas of 0.1% $NO_x$, 0.1% propene, 15% $O_2$, and 10% $H_2O$ balanced with He. The flow rate was approximately 200 cc/min, and approximately 0.2 grams of catalyst was used. These conditions correspond to a space velocity of 30,000 h⁻¹. The reaction products were analyzed by a gas chromatograph equipped with a 6' molecular sieve and a 6' Porapak Q column. The $NO_x$ conversion was calculated from the amount of $N_2$ produced. No $N_2O$ was detected in any of the experiments; thus, the $N_2$ yield corresponded to the $NO_x$ conversion. The catalyst samples were pre-heated to 600° C. in a flow of $O_2$ and He. Then the samples were exposed to the oxygen rich simulated exhaust of 0.1% $NO_x$, 0.1% propene, 15% $O_2$, and 10% $H_2O$ balanced with He. In some experiments the level of oxygen varied, these changes are noted as appropriate below.

Surface Area and Pore Volume Measurements

The surface area, pore volume, and pore size distribution of various alumina samples were determined using a Micromeritics ASAP 2000 system. Approximately 0.2 to 2 grams of catalyst was out gassed under vacuum at 450° C. overnight prior to adsorption measurements. The surface area was determined by multipoints measurement using several relative pressures of $N_2$ to He in the range of 0.06 to 0.2 ($N_2$ surface area 0.162 nm²) at 77 K.

Impurity Analysis of Alumina Samples

The level of the impurity sulfate (SO$_4$) in various alumina samples was determined using ICP analysis. The ICP analysis was performed using a Jobin Yvon 48 instrument. The alumina samples were completely digested in acid (HF) and diluted with de-ionized water. The acid solution was then injected into the plasma and the instrument scanned the sample for all the elements including sulfur.

Thermal Stability Testing

The thermal stability of a γ-alumina prepared according to the above-referenced sol gel procedure was compared to various commercially available aluminas to determine whether its thermal stability were greater or less than these commercially available aluminas. To determine thermal stability surface area measurements for the various alumina samples were determined prior to and following hydrothermal aging tests. The aging test was performed in a 6" in diameter tube furnace set at 800° C. for 15 hours with a 10% H$_2$O/air flow at 5 liters per minute. The results of these tests are shown below in Table 1. The γ-alumina sample, prepared in accordance with the present invention, exhibited the highest surface area following the hydrothermal testing and showed one of the lowest reductions in surface area. The Alcoa HiQ7214F showed the lowest surface area change, but this is believed to be due to its lower initial surface area. Thus, the γ-alumina of the present invention is thermally more stable than a number of commercial aluminas.

TABLE 1

| Samples | Before Aging (m$^2$/g) | After Aging (m$^2$/g) | Surface Area Change (%) |
|---|---|---|---|
| Laroche (VGL-25) | 280 | 146 | 48 |
| W.R. Grace (MI-200) | 237 | 126 | 47 |
| Alcoa (DD447-165) | 160 | 102 | 36 |
| Alcoa (HiQ7214F) | 146 | 118 | 19 |
| Y-alumina | 226 | 172 | 24 |

Figure 2:
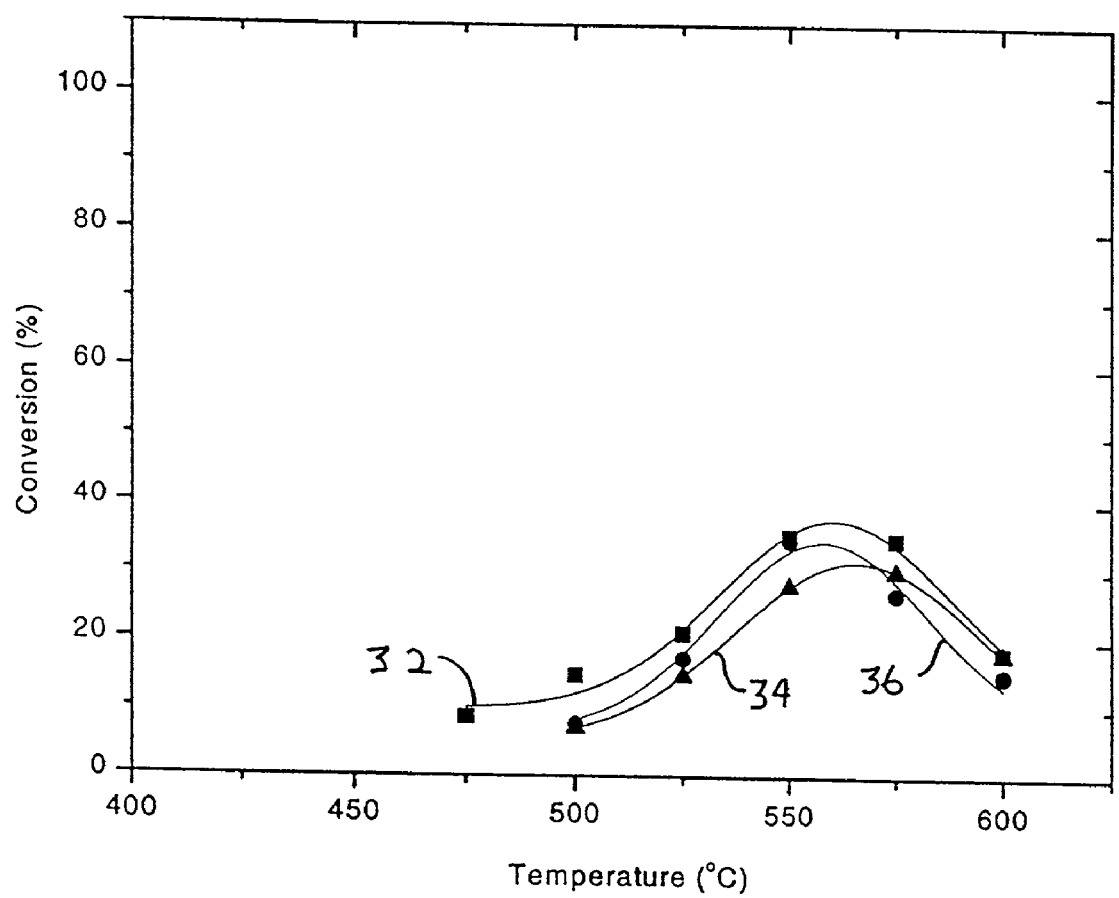
FIG. 2 shows the reduction of NO to $N_2$ over various alumina samples.

FIG. 2 shows the NO reduction to N$_2$ over the various alumina samples disclosed in Table 1 above. The samples were exposed to a stream of 0.1% NO, 0.1% propene, 15% O$_2$, 10% H$_2$O at 200 cc/min at the indicated temperatures. The y-axis is the percent conversion of NO to N$_2$ and the X-axis is the stream temperature. Reference line 32 is the γ-alumina sample prepared by the sol gel method; reference line 34 is the Grace MI-200 sample; and reference line 36 is the Alcoa DD447-165 sample. From FIG. 2 it can be seen that the γ-alumina prepared by the sol gel method shows both a higher maximum NO conversion and a broader temperature window than the commercial aluminas. In addition, the γ-alumina sample showed higher NO conversion at lower temperatures.

Figure 3:
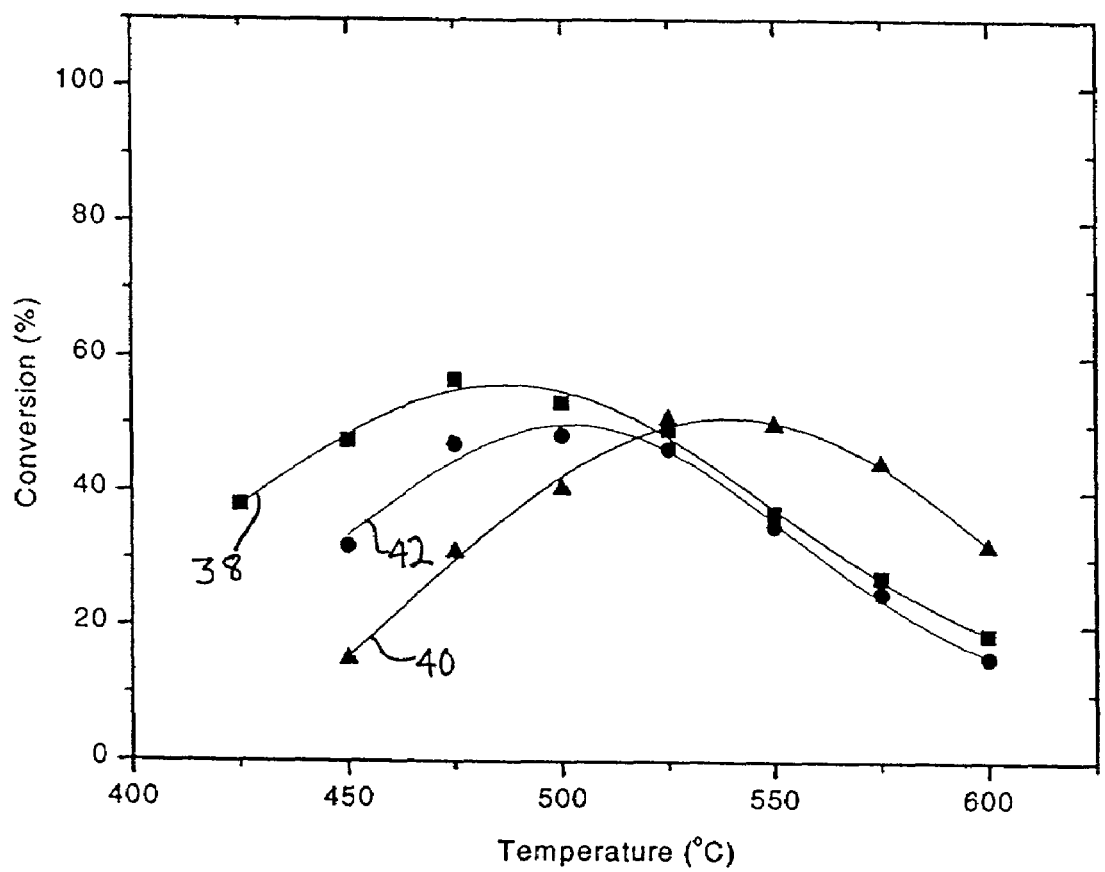
FIG. 3 shows the reduction of $NO_2$ to $N_2$ over the alumina samples used in FIG. 2.

In FIG. 3, the NO$_2$ reduction to N$_2$ over these same samples is shown. In this case the exposure was the same except that the NO was replaced with 0.1% NO$_2$. Reference line 38 represents the γ-alumina prepared by the sol gel method of the present invention; reference line 40 is the Grace MI-200 sample; and reference line 42 is the Aloca DD447-165 sample. As can be seen in FIG. 3, the γ-alumina also showed a higher NO$_2$ conversion than the commercial aluminas. The γ-alumina also showed the lowest Tmax compared to the commercial aluminas.

The results shown in FIGS. 2 and 3 indicate that the γ-alumina prepared by the sol gel method is more selective than commercial aluminas. By the term selective it is meant that the catalyst converts more NO$_x$ to N$_2$ using less hydrocarbon. Also the γ-alumina converts NO$_2$ to N$_2$ to a higher extent than NO. This selectivity makes the sol gel γ-alumina particularly suitable for use in a PAC system.

Effect of Alumina Surface Area, Pore Volume, Pore Size and Sulfate Impurity on the Yield of N$_2$ from NO$_2$ Various alumina samples were obtained from commercial suppliers and in addition the sol gel method of the present invention was modified to generate γ-aluminas having a range of pore volumes.

The sample designated P091098 was prepared by the standard sol gel method with complexing agent as described above. Additional γ-aluminas according to the present invention were prepared with controlled pore structure without using a complexing agent. The procedure was to prepare a white slurry consisting of amorphous aluminum hydroxide by mixing aluminum isoproproxide with an excess of hot water at approximately 80° C. under vigorous stirring conditions. One-third of the slurry was washed with water and this sample was designated as P012299. Another third of the slurry was washed with 2-propanol and designated as P012299a. Washing with 2-propanol provided a different surface tension on the γ-alumina during the drying step. Specifically because the surface tension of 2-propanol is smaller than water sample P012299a maintains its open pore structure resulting in a material containing a higher surface area, larger pore volume and larger average pore size compared to the water-washed sample (P012299). To the final third of the slurry a small amount of nitric acid was added for peptization of the aluminum hydroxide to a clear sol. The clear sol solution was subsequently mixed with 500 milliliters of water. The redispersed sol solution was aged overnight at approximately 85° C. A glassy crystalline material was obtained and designated P012299b. This sample exhibited the smallest pore volume and the smallest pore size.

All of the γ-alumina samples prepared according to the present invention were dried at approximately 90° C. overnight and calcined in a temperature-programmed furnace with a flowing air atmosphere. The furnace temperature was increased up to 700° C. at a ramp rate of 1° C./min and held at 700° C. for 2 hours.

The surface area, pore volume, and average pore size of all the samples were measured using BET measurement as described above. The impurity level of SO$_4$ was determined using ICP data as described above. Table 2 shows the results of the BET, ICP, and conversion of NO$_2$ to N$_2$ for the various alumina samples. In Table 2 the samples are ranked according to their percent yield of N$_2$ from NO$_2$. The top 8 samples have a sulfate impurity level of 0 with the exception of sample TA-1301E. This demonstrates the importance of reducing the sulfate impurity to obtain a catalytically active alumina. Of the top 8 aluminas shown in Table 2, the aluminas having larger pore volumes showed better NO$_2$ reduction activity than aluminas having relatively smaller pore volumes. Among the top 3 aluminas shown in Table 2 the surface areas of these aluminas varied by a factor of 3, however the NO$_2$ reduction performances of these aluminas were comparable. Thus, the surface area does not seem to affect the catalytic activity of the alumina.

Based on these results it is preferred that any γ-alumina produced by any method used for the subject invention have a pore volume of from 1.0 to approximately 2.0 cubic centimeters per gram, and a sulfate impurity level of less than or equal to 0.1% sulfate. The surface area can vary, but it is preferable that it be equal to or greater than 200 m²/g. The γ-alumina can be prepared by any method such as precipitation in addition to the sol gel method so long as these physical characteristics are maintained. The results presented in Table 2 further reinforce the conclusion that the sol gel γ-alumina of the present invention is particularly suitable for use in a PAC system.

TABLE 2

| Rank | Samples | Surface Area (m²/g) | Pore Volume (cc/g) | Average Pore Size (nm) | Impurity $SO_4$ (%) | $N_2$ Yield from $NO_2$ Reduction at 500° C. (%) |
|---|---|---|---|---|---|---|
| 1 | P091098 | 230 | 1.1 | 14 | 0.0 | 60 |
| 2 | P012299a | 380 | 1.8 | 14 | 0.0 | 53 |
| 3 | TA-1301E[†] | 120 | 1.1 | 30 | 0.6 | 53 |
| 4 | Catalox[°] | 150 | 0.49 | 9 | 0.0 | 52 |
| 5 | Puralox[°] | 160 | 0.68 | 15 | 0.0 | 51 |
| 6 | P012299b | 240 | 0.28 | 4 | 0.0 | 49 |
| 7 | Dispal[°] | 80 | 0.62 | 27 | 0.0 | 42 |
| 8 | P012299 | 250 | 0.42 | 5 | 0.0 | 41 |
| 9 | MI-200[†] | 260 | 0.84 | 9 | 0.15 | 40 |
| 10 | TA-2301E[‡] | 128 | 1.1 | 28 | 1.6 | 39 |
| 11 | MI-307 HD[†] | 270 | 0.70 | 8 | 0.31 | 37 |
| 12 | MI-207[†] | 350 | 1.2 | 10 | 0.72 | 32 |
| 13 | MI-307[†] | 170 | 0.77 | 14 | 0.2 | 27 |
| 14 | MI-120[†] | 280 | 0.92 | 10 | 0.7 | 27 |
| 15 | BK-112L[‡] | 280 | 0.45 | 5 | 0.0 | 26 |
| 16 | MT-407[†] | 160 | 0.72 | 14 | 0.16 | 26 |
| 17 | BK-112[‡] | 320 | 0.2 | 3 | 0.0 | 23 |
| 18 | MI-386[†] | 130 | 0.71 | 17 | 0.3 | 19 |

[†]W. R. Grace & Co., Columbia MD, USA;
[‡]Sumitomo Chemical Company Limited, Niihama-shi Ehime-ken, Japan; and
[°]Condea Vista Company, Austin TX, USA.

Figure 4:
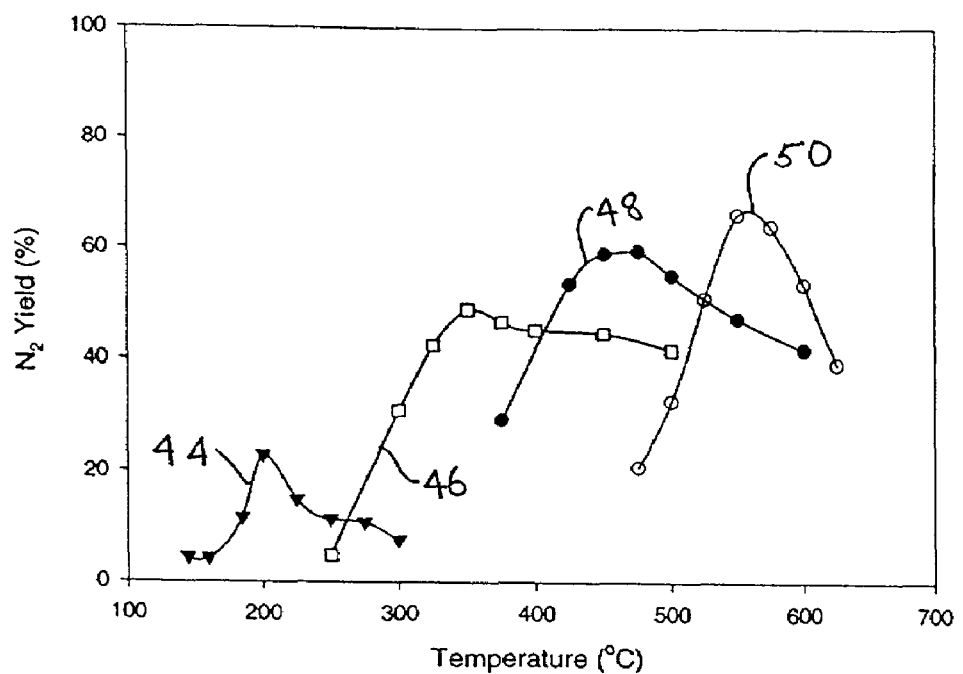
FIG. 4 shows the reduction of NO to $N_2$ over various catalyst samples.

In FIG. 4 metal doped γ-alumina samples prepared according to the present invention were compared to other known standard catalysts for their ability to reduce NO to $N_2$. All the samples were exposed to a test gas of 0.1% NO, 0.1% propene, 9% $O_2$, 7% $H_2O$ at 200 cc/min. Reference line 44 shows the activity of a Pt/Fe ceria doped titanium silicalite catalyst. Reference line 46 shows the activity of a standard Cu-ZSM5 catalyst. Reference line 48 shows a γ-alumina sample prepared by the sol gel method of the present invention and doped with 2.5 weight percent indium. Reference line 50 shows the activity of a γ-alumina sample prepared by the sol gel method of the present invention doped with 24 weight percent gallium. As can be seen from FIG. 4 metal doped γ-alumina catalysts prepared according to the present invention are much more effective in reduction of NO than are either Pt or Cu-ZSM5 catalysts in reducing NO. Also the Pt catalyst produces a substantial amount of $N_2O$, which is a greenhouse gas.

Figure 5:
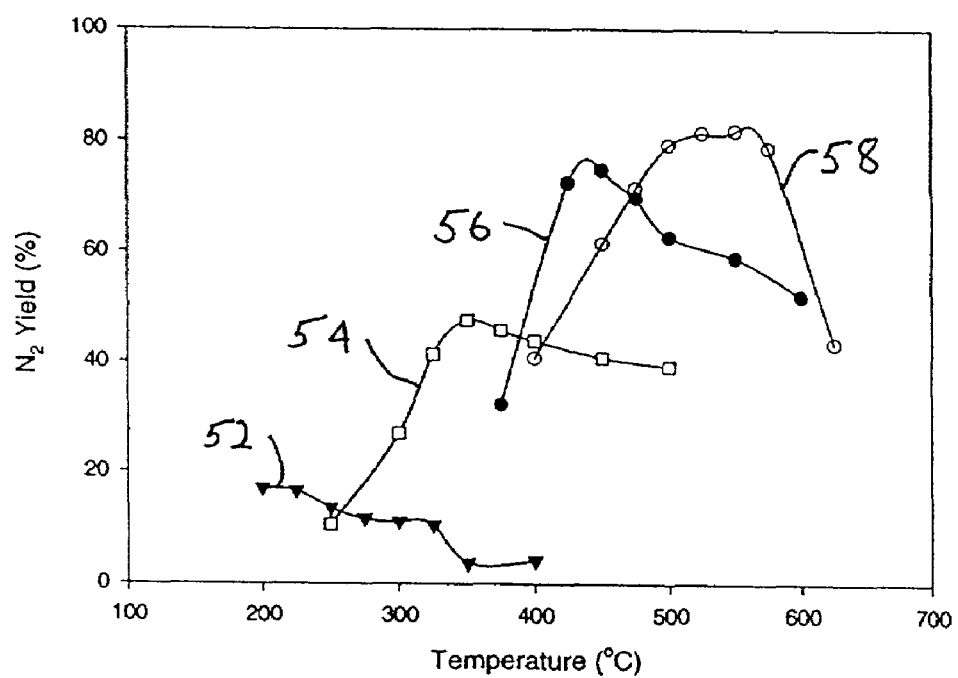
FIG. 5 shows the reduction of $NO_2$ to $N_2$ over the various catalyst samples of FIG. 4.

In FIG. 5 the same samples as in FIG. 4 are shown for their ability to reduce $NO_2$ to $N_2$. The reference lines 52–58 are, respectively, the Pt/Fe ceria doped titanium silicalite catalyst, Cu-ZSM5 catalyst, 2.5 weight % indium doped γ-alumina, and 24 weight % gallium doped γ-alumina. All the conditions are the same as for FIG. 4 except that the feed gas include 0.1% $NO_2$ instead of NO. Again, it can be seen that metal doped γ-alumina catalysts prepared according to the present invention yield more N2 than either Pt or Cu-ZSM5 catalysts. This selectivity makes the metal doped sol gel γ-alumina particularly suitable for use in a PAC system.

Figure 6:
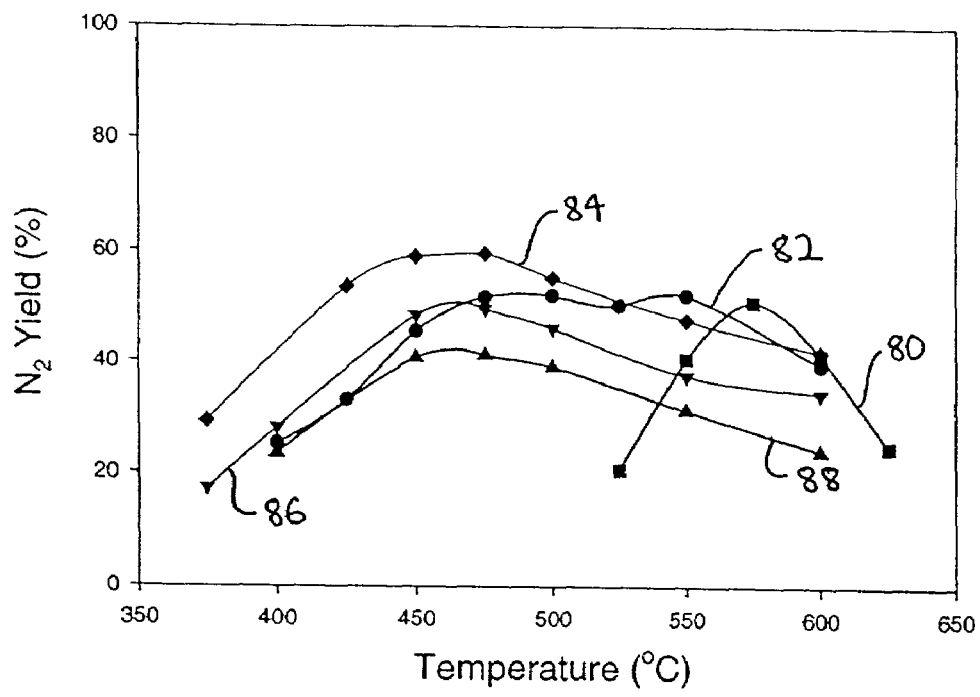
FIG. 6 shows the reduction of NO to $N_2$ over indium doped γ-alumina at various indium levels.
Figure 7:
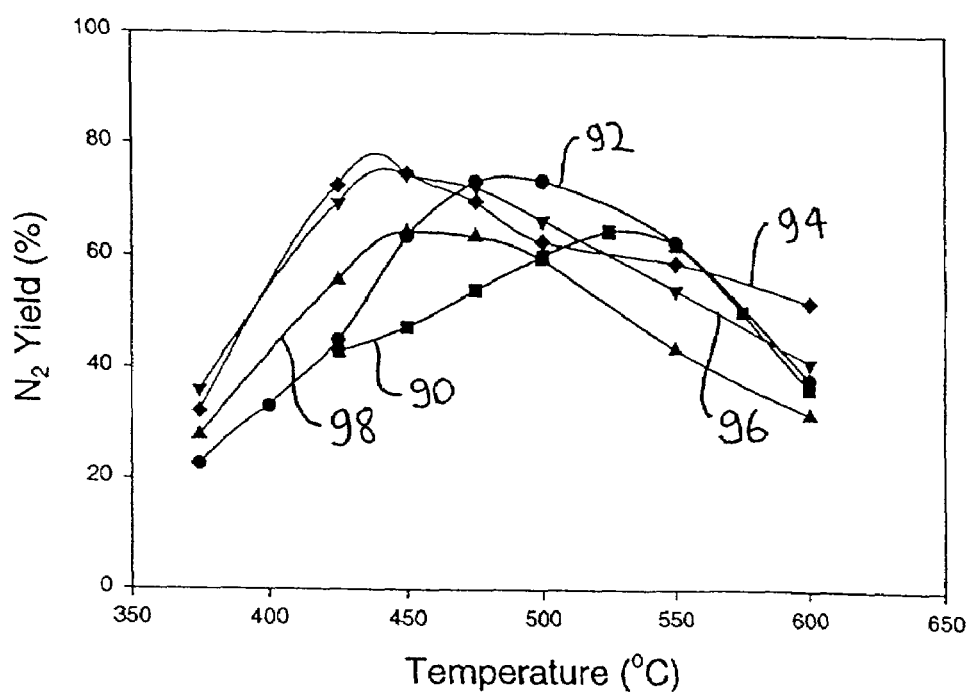
FIG. 7 shows the reduction of $NO_2$ to $N_2$ over the indium doped γ-alumina samples of FIG. 6.

In FIGS. 6 and 7, the effect of various doping levels of indium onto γ-alumina prepared according to the present invention is shown. The metal doped γ-alumina samples were prepared as described above.

In FIG. 6 the ability of the various samples to reduce NO to $N_2$ is shown. The samples were exposed to a stream of 0.1% NO, 0.1% $C_3H_6$, 9% $O_2$, 7% $H_2O$, the balance being He. In FIG. 6, reference number 80 represents a non-doped γ-alumina prepared by the sol gel method; reference 82 represents a 1 weight percent indium doped γ-alumina; reference 84 represents a 2.5 weight percent indium doped γ-alumina; reference number 86 represents a 5 weight percent indium doped γ-alumina; and reference 88 represents a 10 weight percent indium doped γ-alumina.

In FIG. 7 the ability of the various samples to reduce $NO_2$ to $N_2$ is shown. The samples were exposed to a stream of 0.1% $NO_2$, 0.1% $C_3H_6$, 9% $O_2$, 7% $H_2O$, the balance being He. In FIG. 7, reference number 90 represents the non-metal doped γ-alumina; reference number 92 represents the 1 weight percent indium doped γ-alumina; reference line 94 represents the 2.5 weight percent indium doped γ-alumina; reference 96 represents the 5 weight percent indium doped γ-alumina; and reference 98 represents the 10 weight percent indium doped γ-alumina.

It can be seen from FIGS. 6 and 7 that maximal activity was achieved with an indium level of approximately 2.5 weight percent. Furthermore, it can be seen that the indium doped γ-alumina catalyst showed a lower Tmax and exhibited a broader temperature window than the pure γ-alumina itself.

Figure 8:
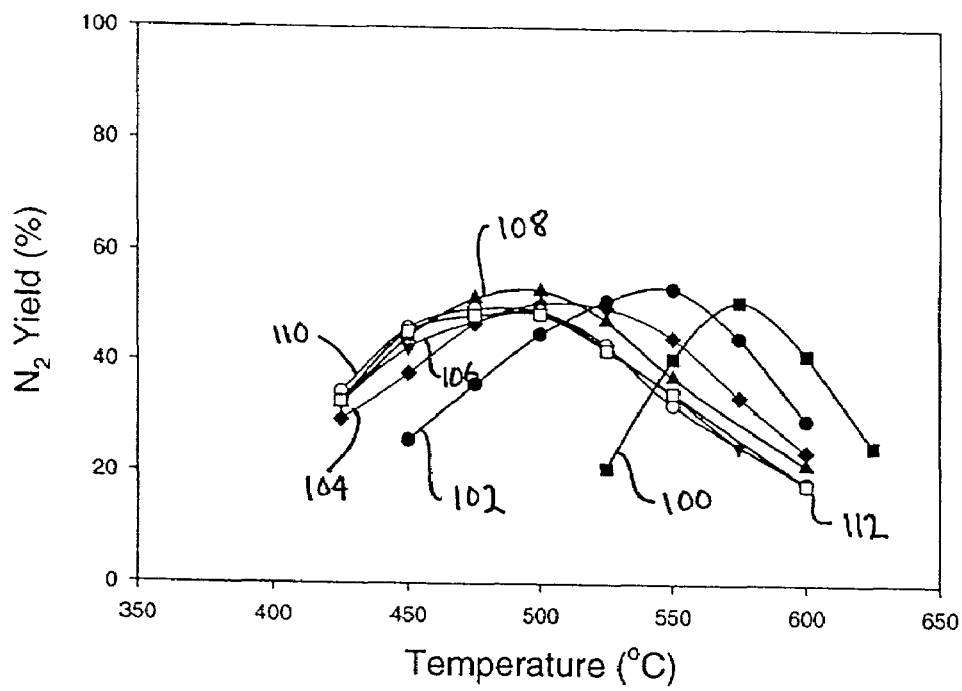
FIG. 8 shows the reduction of NO to $N_2$ over tin doped γ-alumina at various tin levels.
Figure 9:
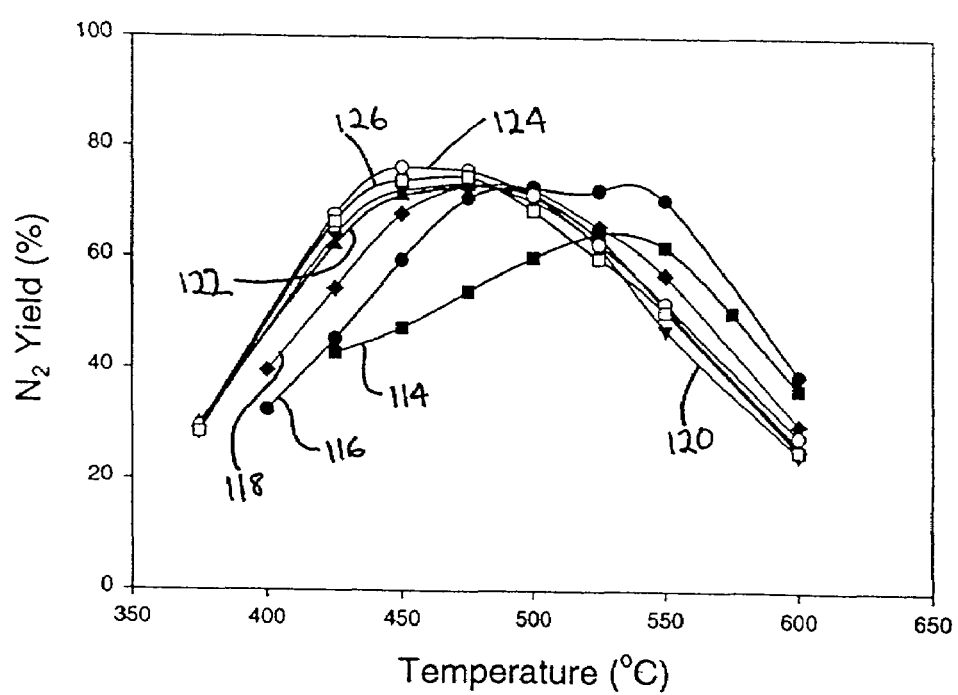
FIG. 9 shows the reduction of $NO_2$ to $N_2$ over the tin doped γ-alumina samples of FIG. 8.

In FIGS. 8 and 9, a similar comparison was done for tin doped γ-alumina prepared according to the present invention. In FIG. 8, reference lines 100–112 represent, respectively, γ-alumina; 1 weight percent tin doped γ-alumina; 2.5 weight percent tin doped γ-alumina; 5 weight percent tin doped γ-alumina; 10 weight percent tin doped γ-alumina; 15 weight percent tin doped γ-alumina; and 20 weight percent tin doped γ-alumina. In FIG. 9, reference numbers 114–126 represent, respectively, γ-alumina; 1 weight percent tin doped γ-alumina; 2.5 weight percent tin doped γ-alumina; 5 weight percent tin doped γ-alumina; 10 weight percent tin doped γ-alumina; 15 weight percent tin doped γ-alumina; and 20 weight percent tin doped γ-alumina. In FIG. 8 the ability of the catalysts to reduce NO to $N_2$ is shown. In FIG. 9 the ability of the catalysts to reduce $NO_2$ to $N_2$ is shown. The results demonstrate that all of the tin doped γ-alumina catalysts show a lower Tmax and broader temperature window when compared to pure γ-alumina. The best performing tin doped γ-alumina was at approximately 10 weight percent.

Figure 10:
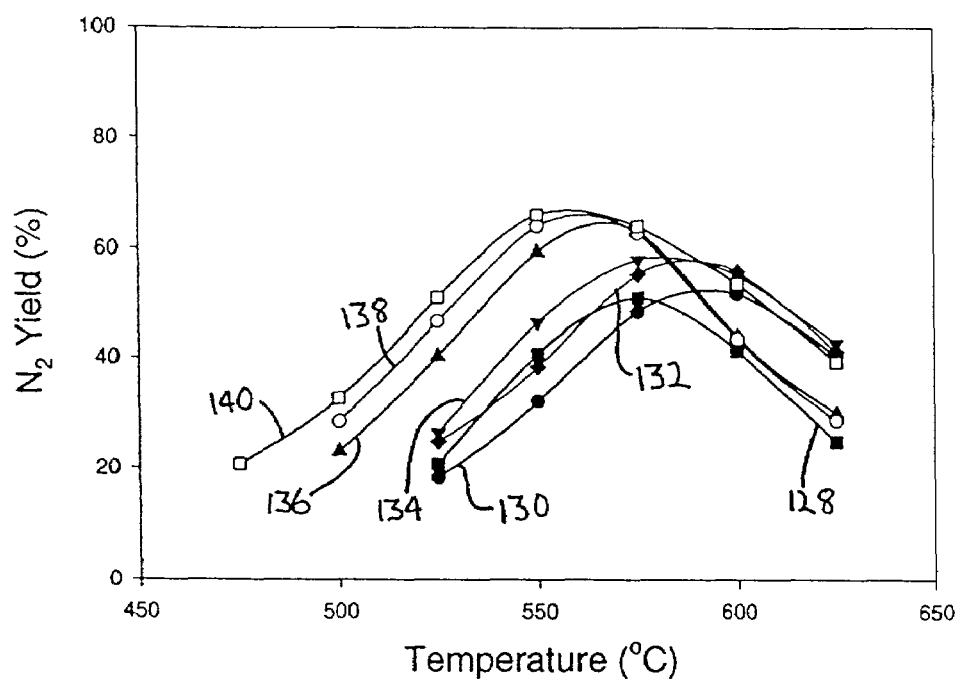
FIG. 10 shows the reduction of NO to $N_2$ over gallium doped γ-alumina at various gallium levels.
Figure 11:
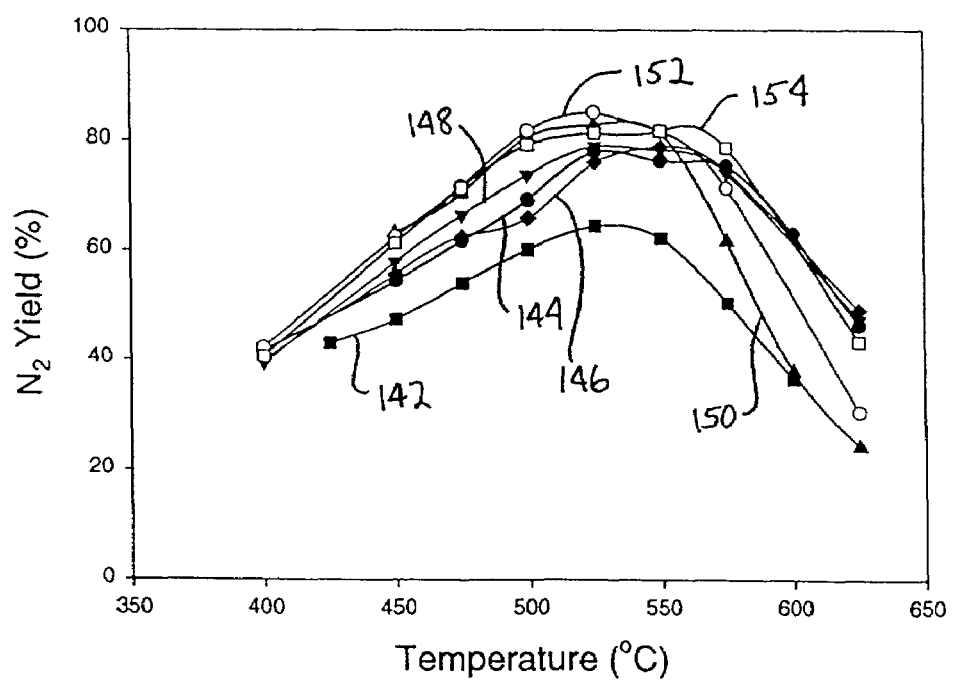
FIG. 11 shows the reduction of $NO_2$ to $N_2$ over the gallium doped γ-alumina samples of FIG. 10.

In FIGS. 10 and 11, a similar comparison was done for gallium doped γ-alumina prepared according to the present invention. FIG. 10 represents the reduction of NO to $N_2$ while FIG. 11 represents the reduction of $NO_2$ to $N_2$ In FIG. 10, reference numbers 128–140 represent, respectively, non-metal doped γ-alumina; 1 weight percent gallium doped γ-alumina; 2.5 weight percent gallium doped γ-alumina; 6 weight percent gallium doped γ-alumina; 10 weight percent gallium doped γ-alumina; 20 weight percent gallium doped γ-alumina; and 24 weight percent gallium doped γ-alumina. In FIG. 11 reference numbers 142–154 represent, respectively, non-metal doped γ-alumina; 1 weight percent gallium doped γ-alumina; 2.5 weight percent gallium doped γ-alumina; 6 weight percent gallium doped γ-alumina; 10 weight percent gallium doped γ-alumina; 20 weight percent gallium doped γ-alumina; and 24 weight percent gallium doped γ-alumina. In addition to the samples shown in FIGS. 10 and 11, a 50 weight percent gallium doped γ-alumina sample has been prepared. 50 weight percent gallium doped γ-alumina shows the highest activity for NO or $NO_2$ reduction. All of the gallium doped γ-alumina catalysts show better activity than the γ-alumina catalyst alone and show a wider temperature window. All of the metal doped catalysts showed more $NO_x$ reduction when NO was replaced with $NO_2$ making these good catalysts for a PAC system.

The Performance of a PAC System for Lean $NO_x$ Reaction

To assess the impact of a non-thermal plasma on metal doped γ-alumina catalysts prepared according to the present invention, a simulated exhaust system was designed by coupling a non-thermal plasma in a tube to a catalytic unit in a standard two-stage setup to form a PAC system. The catalytic unit comprised a quartz tube that was packed with catalyst powder. The catalyst is held in place with quartz wool and fritted quartz disks. A 1 L/min gas flow was used in combination with 1 gram of catalyst powder. This results in a space velocity of 30,000 $hr^{-1}$ depending on the powder used. The simulated oxygen rich exhaust was composed of 500 ppm NO, 300 ppm CO, 8% $CO_2$, 1,5% $H_2O$, 9% $O_2$, 2000 ppm propene, plus or minus 20 ppm $SO_2$, and the balance $N_2$.

Figure 12:
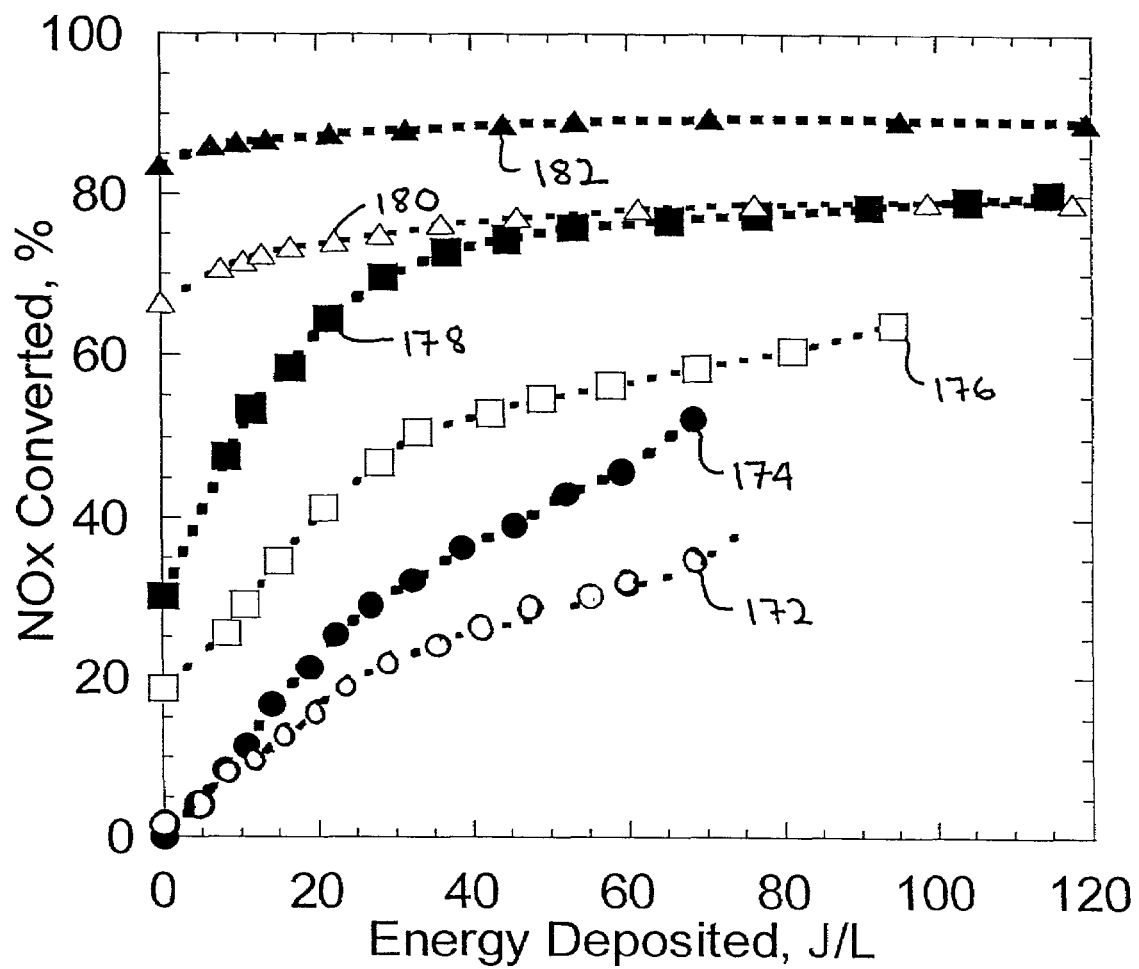
FIG. 12 shows the reduction of $NO_x$ to $N_2$ in a plasma assisted catalytic system designed according to the present invention in the presence and absence of $SO_2$.

In FIG. 12 the data were obtained using a 2.5 weight % indium doped γ-alumina prepared by the sol gel method are shown. In FIG. 12 the y-axis is the percentage of the NO in the simulated exhaust that was converted to $N_2$ and the X-axis is the energy deposited by the non-thermal plasma. The results are shown for with or without $SO_2$ at tempertures of 200° C., 350° C., and 500° C. Reference lines 172 and 174 represent with and without $SO_2$ at 200° C., respectively. Reference lines 176 and 178 represent with and without $SO_2$ at 350° C., respectively. Reference lines 180 and 182 represent with and without $SO_2$ at 500° C., respectively. The catalytic activity of the indium doped γ-alumina was reduced by the presence of the $SO_2$. At tempertures near that of normal exhaust, between 350° C. and 500° C., the coversion by the indium doped γ-alumina was very high with or without $SO_2$. At a temperature of 500° C. the coversion in the absence of $SO_2$ was 90% while the coversion in the presence of $SO_2$ was 80%. Even in the presence of $SO_2$ the conversion was very high compared to other presently known lean $NO_x$ catalyst systems.

In addition to the metals that have been disclosed above for doping of the γ-alumina prepared by the sol gel method, other metals that could be utilized include silver, gold, copper, cobalt, iron, and cerium. In practicing the present invention the γ-alumina preferably has a pore volume of from about 1.0 to about 2.0 cubic centimeters per gram, a surface area of greater than or equal to 200 meters squared per gram, and a sulfate level of less than or equal to 0.1%. In a preferred embodiment the γ-alumina is prepared by a sol gel method.

Of course, various modifications of this invention would come within the scope of the invention.

INDUSTRIAL APPLICABILITY

The present invention is utilized for the treatment of oxygen rich exhaust. In one use, the present invention is utilized to remove nitrogen oxides from diesel engine exhaust. In a first step the diesel engine exhaust is passed through a non-thermal plasma generated by conventional means. Prior to passing through the non-thermal plasma preferably the diesel exhaust is supplemented with additional hydrocarbons, which can comprise diesel fuel itself. In this first step, up to 95% of the nitrogen oxide in the oxygen rich exhaust is converted into nitrogen dioxide and the hydrocarbons are oxidized thereby forming an intermediate exhaust rich in nitrogen dioxide. The intermediate exhaust is passed over at least one metal doped γ-alumina wherein the γ-alumina has a pore size of greater than or equal to 1.0 cubic centimeter per gram. The metal doped γ-alumina converts the nitrogen dioxide to $N_2$. The present invention finds utilization as a method for treating any oxygen rich exhaust such as diesel or lean burn gasoline engine exhaust.

Other aspects, objects and advantages of this invention can be obtained from a study of the drawings, the disclosure and the appended claims.

The invention claimed is:

1. A method for nitrogen oxide ($NO_x$) reduction in an oxygen rich engine exhaust comprising the steps of:
   a) passing an oxygen rich exhaust through a non-thermal plasma (26) thereby converting nitrogen oxide (NO) and hydrocarbons in the oxygen rich exhaust into nitrogen dioxide ($NO_2$) and oxidized hydrocarbons and forming an intermediate exhaust;
   b) passing the intermediate exhaust over at least one metal doped Y-alumina, wherein the Y-alumina has a pore volume of at least 1.0 cubic centimeters per gram, thereby converting the $NO_2$ to nitrogen ($N_2$).

2. A method as claimed in claim 1, wherein step a) comprises the further step of injecting an amount of at least one atomized hydrocarbon (24) into the oxygen rich exhaust prior to passing the oxygen rich exhaust through the non-thermal plasma (26).

3. A method as recited in claim 1, wherein step a) further comprises passing an oxygen rich exhaust having an oxygen content of equal to or greater than 4% through the non-thermal plasma (26).

4. A method as recited in claim 1, wherein step b) further comprises a step of selecting the metal for doping of the Y-alumina from the group consisting of indium, tin, gallium, silver, gold, copper, cobalt, iron, cerium, and mixtures thereof; and the Y-alumina has a surface area of at least 200 square meters per gram.

5. A method as recited in claim 1, wherein step b) comprises a further step of doping the Y-alumina with the metal by incorporating the metal into water used for a gelation step as part of a sol gel method for formation of the Y-alumina.

6. A method as recited in claim 1, wherein step b) comprises a further step of doping the Y-alumina with the metal by bringing the Y-alumina into contact with a solution of the metal wherein the solution of the metal is present in an amount equal to or greater than the total pore volume of the Y-alumina.

7. A method as recited in claim 1, wherein step b) comprises a further step of doping the Y-alumina with from about 1 weight percent to about 10 weight percent indium.

8. A method as recited in claim 1, wherein step b) comprises a further step of doping the Y-alumina with from about 1 weight percent to about 20 weight percent tin.

9. A method as recited in claim 1, wherein step b) comprises a further step of doping the Y-alumina with from about 1 weight percent to about 55 weight percent gallium.

10. A method as recited in claim 1, wherein step b) comprises a further step of preparing the Y-alumina by a sol gel method with at least one of a complexing agent and proponol wash.

11. A method as recited in claim 1, wherein step a) further comprises a step of passing a diesel exhaust through the non-thermal plasma (26) thereby converting the nitrogen oxide (NO) and hydrocarbons in the diesel exhaust into nitrogen dioxide ($NO_2$) and oxidized hydrocarbons and forming an intermediate exhaust.

12. An exhaust treatment system for nitrogen oxide reduction in lean burn engines comprising:
- a non-thermal plasma (26) in an exhaust system that is adapted to receive an oxygen rich exhaust, said non-thermal plasma (26) converting the nitrogen oxide (NO) and hydrocarbons in said oxygen rich exhaust into nitrogen dioxide ($NO_2$) and oxidized hydrocarbons;
- a catalytic unit (28) operably connected to said non-thermal plasma (26) and adapted to receive said oxygen rich exhaust after said non-thermal plasma (26), said catalytic unit (28) comprising at least one metal doped Y-alumina, wherein said Y-alumina has a pore volume of at least 1.0 cubic centimeters per gram and said metal comprises indium, tin, gallium, silver, gold, copper, cobalt, iron, cerium, or mixtures thereof.

13. A system as recited in claim 12, wherein said Y-alumina is doped with from about 1 weight percent to about 10 weight percent indium.

14. A system as recited in claim 12, wherein said Y-alumina is doped with from about 1 weight percent to about 20 weight percent tin.

15. A system as recited in claim 12, wherein said Y-alumina is doped with from about 1 weight percent to about 55 weight percent gallium.

16. A system as recited in claim 12, wherein said Y-alumina has a pore volume of from 1.0 to 2.0 cubic centimeters per gram.

17. A system as recited in claim 12, wherein said Y-alumina being sulfate-free.

18. A system as recited in claim 12, wherein said Y-alumina is doped with a metal comprising either 2.5 weight percent indium, 10 weight percent tin, or 50 weight percent gallium.

19. A system as recited in claim 12, wherein said Y-alumina has a surface area of at least 200 meters squared per gram.

20. A system as recited in claim 12, wherein said Y-alumina is doped with mixtures of metals comprising indium, tin, and gallium.

* * * * *

UNITED STATES PATENT AND TRADEMARK OFFICE
CERTIFICATE OF CORRECTION

PATENT NO. : 7,081,231 B1  
APPLICATION NO. : 09/708863  
DATED : July 25, 2006  
INVENTOR(S) : Christopher L. Aardahl et al.

Page 1 of 1

It is certified that error appears in the above-identified patent and that said Letters Patent is hereby corrected as shown below:

On Title Page, Item (75)
In the Inventors section on the front of the patent:

Please delete

"Mari Lou Balmer-Miller, West Richland, WA (US)", and add

--Mari Lou Balmer-Millar, West Richland, WA (US)--

Signed and Sealed this

Twenty-sixth Day of December, 2006

JON W. DUDAS
*Director of the United States Patent and Trademark Office*